(12) United States Patent
Kang et al.

(10) Patent No.: US 7,321,206 B2
(45) Date of Patent: Jan. 22, 2008

(54) LED DRIVING APPARATUS

(75) Inventors: Jeong-il Kang, Yongin-si (KR); Sang-hoon Lee, Ulsan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/642,840

(22) Filed: Dec. 21, 2006

(65) Prior Publication Data

US 2007/0188112 A1 Aug. 16, 2007

(30) Foreign Application Priority Data

Feb. 13, 2006 (KR) ................. 10-2006-0013740

(51) Int. Cl.
*G05F 1/00* (2006.01)
(52) U.S. Cl. ............... 315/291; 315/169.1; 315/224; 315/225; 315/119; 315/308; 345/82; 345/102
(58) Field of Classification Search ............ 315/169.1, 315/169.3, 291, 224, 225, 307, 308, 119, 315/127, 312; 345/46, 52, 82, 83, 102; 347/236–238, 347/232; 362/800; 340/815.45
See application file for complete search history.

(56) References Cited

U.S. PATENT DOCUMENTS 6,630,801 B2* 10/2003 Schuurmans ................ 315/307

2005/0231127 A1* 10/2005 Yamamoto et al. ......... 315/224
2006/0192728 A1* 8/2006 Kim ............................ 345/46

FOREIGN PATENT DOCUMENTS

| JP | 2004-194452 | 7/2004 |
| JP | 2005-033853 | 2/2005 |
| JP | 2005-160178 | 6/2005 |

\* cited by examiner

*Primary Examiner*—Haissa Philogene
(74) *Attorney, Agent, or Firm*—Roylance, Abrams, Berdo & Goodman, L.L.P.

(57) ABSTRACT

An apparatus for driving an LED is provided. The driving apparatus may have an LED unit including at least one LED, and a current controlling unit for controlling the magnitude of current flowing through the LED unit in response to a control signal. The LED driving apparatus may include a voltage detecting unit for detecting a voltage across the LED unit and a control signal blocking unit for comparing the voltage detected by the voltage detecting unit with a reference voltage. The control signal blocking part prevents the control signal from being applied to the current controlling unit when the detected voltage is lower than the reference voltage. With this configuration, the LED driving apparatus is capable of preventing a circuit from being damaged by overcurrent by cutting off a control signal when a determined number or more of LEDs are short-circuited or otherwise not operational.

18 Claims, 3 Drawing Sheets

LED DRIVING APPARATUS

CROSS-REFERENCE TO RELATED APPLICATIONS

This application claims the benefit under 35 U.S.C. §119(a) of Korean Patent Application No. 2006-0013740, filed on Feb. 13, 2006, in the Korean Intellectual Property Office, the entire disclosure of which is hereby incorporated by reference.

BACKGROUND OF THE INVENTION

1. Field of the Invention

The present invention relates to an LED driving apparatus. More particularly, the present invention relates to an LED driving apparatus for driving LEDs (light emitting diodes) with a PWM (pulse width modulation) signal.

2. Description of the Related Art

Generally, a plurality of LEDs, which are provided as an array for three primary colors red, green and blue, is used for a backlight unit of an LCD (liquid crystal display).

A conventional LED driving apparatus may be constructed as a circuit shown in FIG. 1. In an LED driving apparatus 1 of FIG. 1, when a switching FET (field effect transistor) 5 is turned on, current Io supplied from a power supply 15 flows through a plurality of LEDs 9 and an inductor 11. If the switching FET 5 is turned off, current flows through the inductor 11, a diode 7 and the LED 9. The LED driving apparatus may further include a capacitor 13 to decrease electromagnetic interference or current stress on the LEDs 9.

In more detail, a control block 3 controls flow of current through the LEDs 9 based on a PWM signal having a predetermined duty cycle. When the current flowing through the LEDs 9 reaches a predetermined peak value Iref, the control block 3 controls the current flowing through the LEDs 9 to be cut off. Therefore, the amount of current flowing through the LEDs is adjusted to control the amount of light emitted from the LEDs 9.

For example, if a logic high PWM signal is input, the control block 3 controls the switching FET 5 to be turned on, thereby increasing the amount of current flowing through the LEDs 9. When the current flowing through the LEDs 9 reaches the peak value Iref, the control block 3 controls the switching FET 5 to be turned off, thereby decreasing the amount of current flowing through the LEDs 9. After a predetermined time elapses and the PWM signal goes into logic high, the control block 3 controls the switching FET 5 to be turned on, thereby increasing the amount of current flowing through the LEDs 9. These operations are repeatedly performed.

However, when the control block 3 transmits an on signal or an off signal to the switching FET 5, there may be a delay. Such a delay may cause a problem if the LEDs 9 are short-circuited, for example, when the LEDs 9 reach an end of life or when any defect occurs in the LEDs 9.

For example, in a state where the amount of current, after reaching the peak value Iref, is not sufficiently decreased, if the switching FET 5 is allowed to be turned on by the PWM signal, the amount of current flowing through the LEDs 9 increases again. Then, the amount of current flowing through the LEDs 9 reaches the peak value Iref, and then the control block 3 transmits the off signal to the switching FET 5.

However, at this time, if there is a delay in transmitting the off signal to the switching FET 5, a suitable timing capable of controlling the current amount flowing at the LED 9 is missed, and accordingly, the amount of current flowing through the LEDs 9 exceeds the peak value Iref while the switching FET 5 remains turned on. The control block 3 cannot adequately control the amount of current overflowing through the LEDs 9. Ultimately, the amount of current flowing through the LEDs 9 continues to increase, potentially damaging the circuit.

Accordingly, there is a need for an improved apparatus and method for driving an LED.

SUMMARY OF THE INVENTION

Exemplary embodiments of the present invention address at least the above problems and/or disadvantages and provide at least the advantages described below. Accordingly, it is an aspect of the present invention to provide an apparatus for driving an LED that is capable of protecting a circuit by cutting off a control signal when any defect occurs in an LED.

Additional aspects and/or advantages of the present invention will be set forth in part in the description which follows and, in part, will be obvious from the description, or may be learned by practice of the present invention.

The foregoing and/or other aspects of exemplary embodiments of the present invention are achieved by providing an LED driving apparatus comprising an LED unit including at least one LED, and a current controlling unit for controlling the magnitude of current flowing through the LED unit in response to a control signal, including a voltage detecting unit for detecting a voltage across the LED unit and a control signal blocking unit for comparing the voltage detected by the voltage detecting unit with a reference voltage, and for preventing the control signal from being applied to the current controlling unit when the detected voltage is lower than the reference voltage.

In an exemplary embodiment, the control signal is a PWM signal.

In an exemplary embodiment, the voltage detecting unit may detect the voltage across the LED unit by using at least one resistor.

In an exemplary embodiment, the control signal blocking unit may include a transistor, and the transistor may include a base terminal connected to the voltage detecting unit, an emitter terminal to which the control signal is input, and a collector terminal connected to the current controlling unit for supplying the control signal to the current controlling unit.

In an exemplary embodiment, the control signal blocking unit may prevent the control signal from being applied to the current controlling unit when a voltage difference between the base terminal and the emitter terminal is lower than the reference voltage.

In an exemplary embodiment, the LED driving apparatus may further include a pull-down resistor for grounding the current controlling unit when the control signal is cut off by the control signal blocking unit.

BRIEF DESCRIPTION OF THE DRAWINGS

The above and/or other aspects and advantages of the present invention will become apparent and more readily appreciated from the following description of exemplary embodiments, taken in conjunction with the accompanying drawings of which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Reference will now be made in detail to exemplary embodiments of the present invention which are illustrated in the accompanying drawings.

Figure 1:
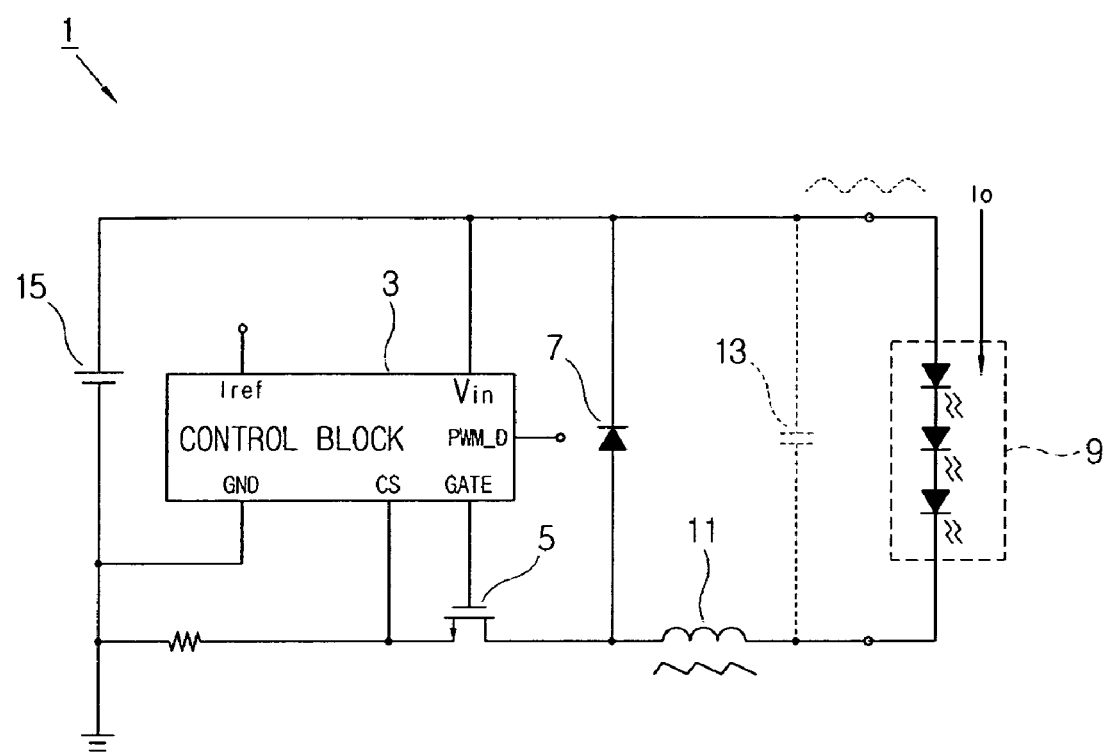
FIG. 1 is a circuit diagram showing a circuit configuration of a prior art LED driving apparatus.
Figure 2:
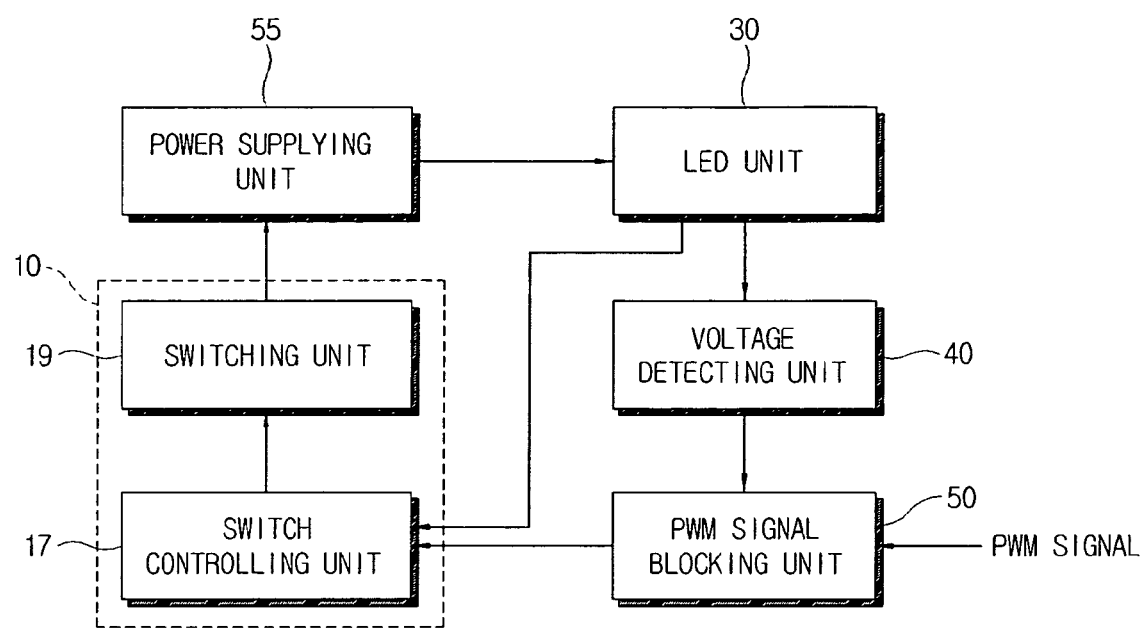
FIG. 2 is a control block diagram showing a configuration of an LED driving apparatus according to an exemplary embodiment of the present invention.

FIG. 2 is a control block diagram of a configuration of an LED driving apparatus according to an exemplary embodiment of the present invention.

As illustrated in FIG. 2, the LED driving apparatus according to an exemplary embodiment of the present invention comprises a power supplying unit 55, a current controlling unit 10, an LED (light emitting diode) unit 30, a voltage detecting unit 40 and a PWM signal blocking unit 50. In an exemplary embodiment, the LED unit 30 comprises at least one LED and the current controlling unit 10 comprises a switching unit 19 and a switch controlling unit 17. It is also noted that the above exemplary embodiment includes a PWM signal as a control signal. However, the use of a PWM signal is merely exemplary and not to the exclusion of other control signals.

Hereinafter, each block of the LED driving apparatus according to an exemplary embodiment of the present invention will be described in more detail with reference to FIG. 3.

Figure 3:
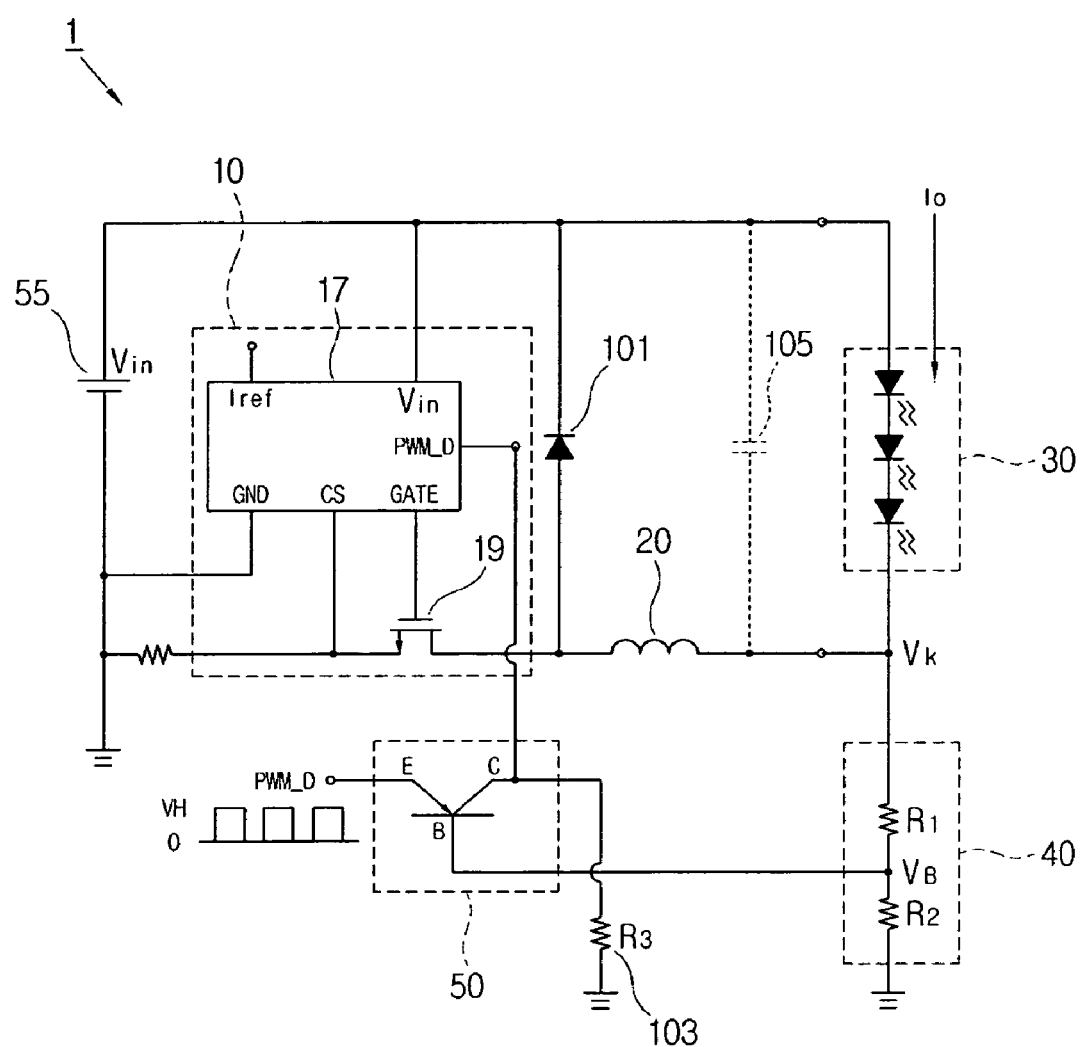
FIG. 3 is a circuit diagram showing an example of a circuit configuration of the LED driving apparatus according to an exemplary embodiment of the present invention.

Referring to FIG. 3, the current controlling unit 10 controls the magnitude of current Io flowing through the LED unit 30. Also, the LED driving apparatus may comprise a small capacity capacitor 105 to decrease EMI (electromagnetic interference) or current stress of the LED unit 30.

The switching unit 19 receives an on signal or an off signal from the switching controlling unit 17, which will be described later, to supply or cut off power from the power supplying unit 55 to the LED unit 30. In an exemplary embodiment, the switching unit 19 may be realized with a switching circuit comprising a MOSFET whose gate is input with a signal from the switch controlling unit 17. However, the use of a MOSFET is merely exemplary and other switching devices may be used, for example a bipolar transistor.

When the switching unit 19 is turned on, current Io flows through the LED unit 30 and an inductor 20 by a voltage $V_{in}$ supplied by the power supplying unit 55. The energy of the current flowing through the LED unit 30 is stored in the inductor 20.

When the switching unit 19 is turned off, a closed circuit is constituted by the inductor 20, the LED unit 30 and a diode 101, thereby allowing current to flow through the LED unit 30 by the energy stored in the inductor 20. While the energy stored in the inductor 20 is gradually discharged through the closed circuit, the current flowing through the LED unit 30 correspondingly decreases.

The switch controlling unit 17 may cause the switching unit 19 to turn on by a PWM dimming signal and may cause the switching unit 19 to turn off by an analog dimming signal.

A duty ratio of the LED unit 30 may be controlled through the PWM dimming signal by using a PWM signal input through a PWM pin (PWM_D). Also, the amount of current flowing through the LED unit 30 may be controlled through the analog dimming signal by detecting the current flowing through the LED unit 30 with a current detecting pin (CS) and comparing the detected current with a peak current value Iref.

That is, the switch controlling unit 17 continuously detects the magnitude of the current flowing through the LED unit 30 by means of the current detecting pin CS and compares the detected current magnitude with the peak value Iref. When the current flowing through the LED unit 30 reaches the peak value Iref, the switch controlling unit 17 causes the switching unit 19 to turn off. When the PWM signal input through the PWM pin (PWM_D) is logically high, the switch controlling unit 17 controls the magnitude of current flowing through the LED unit 30 by turning on the switching unit 19. In an exemplary embodiment, the peak current value Iref may be set considering a maximum rated current of the LED unit 30.

The voltage detecting unit 40 detects a voltage across the LED unit 30. In an exemplary embodiment, the voltage detecting unit 40 may be realized with a voltage dividing circuit comprising two resistors R1 and R2. A voltage $V_B$, which is a division of a cathode voltage $V_k$ of the LED unit 30 by the resistors R1 and R2, is applied to the PWM signal blocking unit 50, which will be described below.

The PWM signal blocking unit 50 supplies or cuts off the PWM signal to the PWM pin (PWM_D) in response to a voltage detected by the voltage detecting unit 40. The PWM signal blocking unit 50 may be realized with a transistor. In an exemplary embodiment, the PWM signal blocking unit 50 may comprise a PNP bipolar junction transistor, a PMOS (P-channel metal oxide semiconductor) transistor, and the like.

An exemplary PWM signal blocking unit 50 realized with a PNP type bipolar transistor comprises a base terminal B, an emitter terminal E and a collector terminal C. In an exemplary embodiment, the base terminal B of the PNP transistor is connected to the voltage detecting unit 40 and is applied with the voltage $V_B$ detected by the voltage detecting unit 40. The PWM signal is applied to the emitter terminal E, and the collector terminal C is connected to the PWM pin (PWM_D) of the current controlling unit 10. It is again noted that the use of a PWM signal as the control signal is merely exemplary and not used to the exclusion of other appropriate control signals.

An exemplary PWM signal blocking unit 50 is turned on or off depending on a voltage difference between the emitter terminal E and the base terminal B. For example, when the voltage difference between the emitter terminal E and the base terminal B is higher than a reference voltage, the PWM signal blocking unit 50 is turned on. On the contrary, when the voltage difference between the emitter terminal E and the base terminal B is lower than the reference voltage, the PWM signal blocking unit 50 is turned off. Here, the reference voltage is a "turn-on" voltage $V_{eb}$ of the PMOS transistor.

In an exemplary embodiment, the PWM signal blocking unit 50 is turned on if the voltage difference ($V_H$-$V_B$) between the voltage $V_H$, applied to the emitter when the PWM signal is logically high, and the voltage $V_B$, applied to the base, is higher than the "turn-on" voltage $V_{eb}$. If the voltage difference $V_H$-$V_B$ is higher than the "turn-on" voltage, then, the emitter terminal E and the collector terminal C become conductive. Therefore, the PWM signal input through the emitter terminal E is applied to the PWM pin (PWM_D) of the current controlling unit 10.

In an exemplary embodiment, the PWM signal blocking unit 50 is turned off if the voltage difference ($V_H$-$V_B$) between the emitter voltage $V_H$ and the base voltage $V_B$ is lower than the "turn-on" voltage $V_{eb}$ when the PWM signal is logically high. Then, the PWM signal to be applied to the current controlling unit 10 through the emitter terminal E is cut off.

In an exemplary embodiment, the LED driving circuit may further comprise a pull-down resistor R3 103 for grounding the PWM pin (PWM_D). When the PWM signal is cut off, the PWM pin (PWM_D) is grounded by the pull-down resistor R3 103, thereby stopping a driving of the LED driving circuit.

In an exemplary embodiment, the voltage $V_B$ detected by the voltage detecting unit 40 may be increased since some or all of the LEDs in the LED unit 30 may be short-circuited, or otherwise damaged, and the cathode voltage $V_K$ of the LED unit 30 is increased. More specifically, if a determined number of LEDs in the LED unit 30 are short-circuited, the voltage difference ($V_H$-$V_B$) between the emitter voltage $V_H$ and the base voltage $V_B$ of the PWM signal blocking unit 50 becomes lower than the "turn-on" voltage $V_{eb}$. Thus, even though the PWM signal becomes logically high, the PWM signal blocking unit 50 cuts off the PWM signal, thereby protecting the LED unit 30.

In an exemplary embodiment, it is possible to set the resistances of the resistors R1 and R2 suitably in the voltage dividing circuit of the voltage detecting unit 40 so that the PWM signal blocking unit 50 can cut off the PWM signal when the determined number or more of LEDs in the LED unit 30 are short-circuited or otherwise damaged. That is, the ability to set the resistances of R1 and R2 allows control of the number of LEDs that constitute the determined number.

Thereby, even when the determined number or more of LEDs in the LED unit 30 are short-circuited, it is possible to prevent a circuit from being damaged by overcurrent by cutting off the PWM signal.

As is apparent from the above description, the present invention provides an LED driving apparatus capable of preventing a circuit from being damaged by overcurrent by cutting off a PWM signal when a determined number or more of LEDs are short-circuited.

In addition, exemplary embodiments of the present invention provide an LED apparatus capable of preventing a circuit from being damaged without excessive cost. Although a few exemplary embodiments of the present invention have been and described, it will be appreciated by those skilled in the art that changes may be in these embodiments without departing from the principles and spirit of the invention, cope of which is defined in the appended claims and their equivalents.

What is claimed is:

1. An LED driving apparatus having an LED unit including at least one LED, and a current controlling unit for controlling the magnitude of current flowing through the LED unit in response to a control signal, comprising:
   a voltage detecting unit for detecting a voltage across the LED unit; and
   a control signal blocking unit for comparing the voltage detected by the voltage detecting unit with a reference voltage, and for preventing the control signal from being applied to the current controlling unit when the detected voltage is higher than the reference voltage.

2. The LED driving apparatus according to claim 1, wherein the voltage detecting unit detects the voltage across the LED unit by using at least one resistor.

3. The LED driving apparatus according to claim 2, wherein the control signal blocking unit comprises a transistor, and
   wherein the transistor comprises a first terminal connected to the voltage detecting part, a second terminal to which the control signal is input, and a third terminal connected to the current controlling unit for supplying the control signal to the current controlling part.

4. The LED driving apparatus of claim 3, wherein the transistor comprises a bipolar junction transistor (BJT) and further wherein the first terminal is a base terminal of the BJT, the second terminal is an emitter terminal of the BJT and the third terminal is a collector terminal of the BJT.

5. The LED driving apparatus according to claim 4, wherein the control signal blocking unit prevents the control signal from being applied to the current controlling unit when a voltage difference between the base terminal and the emitter terminal is lower than the reference voltage.

6. The LED driving apparatus according to claim 1, wherein the control signal blocking unit comprises a transistor, and
   wherein the transistor comprises a first terminal connected to the voltage detecting part, a second terminal to which the control signal is input, and a third terminal connected to the current controlling unit for supplying the control signal to the current controlling part.

7. The LED driving apparatus of claim 6, wherein the transistor comprises a bipolar junction transistor (BJT) and further wherein the first terminal is a base terminal of the BJT, the second terminal is an emitter terminal of the BJT and the third terminal is a collector terminal of the BJT.

8. The LED driving apparatus according to claim 7, wherein the control signal blocking unit prevents the control signal from being applied to the current controlling unit when a voltage difference between the base terminal and the emitter terminal is lower than the reference voltage.

9. The LED driving apparatus according to claim 1, further comprising a pull-down resistor for grounding the current controlling unit when the control signal is cut off by the control signal blocking part.

10. The LED driving apparatus according to claim 1, wherein the control signal is a pulse width modulation (PWM) signal.

11. A light emitting diode (LED) driving apparatus, comprising:
    a voltage detecting unit for detecting a voltage at an LED;
    a current controlling part; and
    a control signal blocking unit for comparing the voltage detected by the voltage detecting unit with a reference voltage, and for preventing a control signal from being applied to the current controlling unit when the detected voltage is higher than the reference voltage.

12. The LED driving apparatus of claim 11, wherein the voltage detecting unit comprises at least one resistor for detecting the voltage at the LED.

13. The LED driving apparatus of claim 12, wherein the control signal blocking unit comprises a transistor, and further wherein the transistor comprises a first terminal connected to the voltage detecting part, a second terminal to which the control signal is input, and a third terminal connected to the current controlling unit for supplying the control signal to the current controlling part.

14. The LED driving apparatus of claim 13, wherein the control signal blocking unit prevents the control signal from being applied to the current controlling unit when a voltage difference between the first terminal and the second terminal is lower than the reference voltage.

15. The LED driving apparatus of claim 13, wherein the transistor is a bipolar junction transistor (BJT) and further wherein the first terminal comprises a base terminal of the BJT, the second terminal comprises an emitter of the BJT, and the third terminal comprises a collector terminal of the BJT.

16. The LED driving apparatus according to claim 15, wherein the control signal blocking unit prevents the control signal from being applied to the current controlling unit when a voltage difference between the base terminal and the emitter terminal is lower than the reference voltage.

17. The LED driving apparatus according to claim 11, wherein the current controlling unit further comprises a pull-down resistor for grounding the current controlling unit when the control signal is cut off by the control signal blocking part.

18. The LED driving apparatus of claim 11, wherein the control signal is a pulse width modulation (PWM) signal.

* * * * *